United States Patent [19]

Bates

[11] Patent Number: 4,940,882

[45] Date of Patent: Jul. 10, 1990

[54] WELDING FLUX AND WELDING ELECTRODE

[75] Inventor: Thomas O. Bates, Huntington, W. Va.

[73] Assignee: Inco Alloys International, Inc., Huntington, W. Va.

[21] Appl. No.: 343,630

[22] Filed: Apr. 27, 1989

[51] Int. Cl.$^5$ ............................................. B23K 35/22
[52] U.S. Cl. .......................... 219/146.22; 219/145.23
[58] Field of Search ....... 219/146.1, 137 WM, 137 R, 219/146.3, 126, 145.23, 146.24, 146.22; 75/253

[56] References Cited

U.S. PATENT DOCUMENTS

| | | | |
|---|---|---|---|
| 2,520,806 | 8/1950 | Kihlgren | 75/253 |
| 3,124,479 | 3/1964 | Witherell | 219/146.22 |
| 4,639,576 | 1/1987 | Shoemaker | 219/146.1 |

Primary Examiner—Clifford C. Shaw
Attorney, Agent, or Firm—Francis J. Mulligan, Jr.; Edward A. Steen

[57] ABSTRACT

A welding flux and welding electrode containing a copper-nickel core is described which results in very low porosity when used in the overhead welding position as well as all other welding positions.

15 Claims, No Drawings

WELDING FLUX AND WELDING ELECTRODE

The present invention relates to a copper-nickel alloy, and, more particularly, to a copper-nickel welding product which can be used in the overhead welding position without the occurrence of detrimental weld porosity.

As is well known to those skilled in the art, copper-nickel welding products, generally speaking, are by no means new. They have been widely used in a host of commercial/industrial applications for several decades. A particular application of considerable importance has been the marine field where copper-nickel alloys have witnessed extensive use due to their renowned capability of resisting corrosive attack, whether the attack be occasioned by marine atmosphere or sea water. In this connection, one of most widely known welding products for marine environment is Welding Electrode 187 (187N in specifications), an electrode described in U.S. Pat. No. 3,124,479 ('479). It is this electrode which is the focus of the problem delineated infra.

Welding Electrode 187 (WE 187 herein) is said to be an all-purpose electrode, i.e., an electrode which performs satisfactorily in all four welding positions, flat, horizontal, vertical and overhead. However, its attributes not withstanding, difficulty has recently been experienced in welding in the overhead position. By way of explanation, a well known shipbuilding company doing business with the U.S. Navy has expressed dissatisfaction with WE 187 since it has been unable to qualify welders in respect of the overhead position. The problem involved is one of excessive porosity, a problem which has been confirmed by actual on site inspection.

To the foregoing explanation it should be mentioned that the acceptance test for Welding Electrode 187N in the past included a 5G pipe joint, i.e., a fixed position weldment requiring at least some part of the welding operation to be conducted in the overhead position. This position, often referred to as the six o'clock position, for most welds manifested some porosity. But because the acceptance criteria took the entire length of the weld into account, the bulk of which was porosity free, the porosity at the six o'clock position was rarely sufficient to cause the rejection of a welded joint. Thus, the problem became one of overcoming the adverse porosity effect over the entire length of the weld; otherwise, qualification acceptance would not obtain.

In approaching the problem various courses were pursued without success. For example, quality control over the processing of the 187 core wire was monitored to determine if subsurface oxides, slivers, pipes and the like might be causative. Accordingly, WE 187 core wire was cleansed, given a flash pickle in $HNO_3$, water rinsed and dried. Production coatings were applied to the wire as well as to an uncleansed sample wire from the same alloy heat. Overhead joints were produced. Upon radiographic examination porosity was shown to be present in both cases. No improvement was seen in total porosity count and there was no discernible difference between the wires.

Another approach involved using a 900° F. (482° C.) heat treatment for 2 hours in hydrogen, this to reduce existing surface oxides. The result—porosity without noticeable improvement. Variations in the electrode coating used in conjunction with WE 187 were also evaluated but without success.

The problem was further complicated by the fact that overcoming the subversive porosity also required ease of operability be maintained. This requires achieving arc stability, minimum of spatter, smoothness of arc together with good viscosity of the weld puddle, ease of slag removal, good bead contour, satisfactory slag coverage, etc. Arc stability and smoothness of arc are important in transferring components of a flux across the arc. Slag removal is important in order that slag release from the weld metal upon cutting off the arc. And satisfactory puddle viscosity is important such that the slags trails the arc rather than preceding it, etc. It might be added that adequate slag coverage be maintained in all welding positions and not simply overhead. Any one of the aforementioned factors can be rendered undesirably difficult by, say, components of a flux and percentages used even though a sound weld deposit result.

INVENTION SUMMARY

It has now been found that a special coating flux in conjunction with a copper-nickel core wire as described infra enables the welding operation to be carried on in the overhead position without the occurrence of deleterious porosity and without adversely affecting ease of operability. This new electrode has been qualified in respect of the requirements imposed under Naval Specification MIL-E-22200/4C.

INVENTION EMBODIMENTS

Generally speaking, and in accordance with the invention, the core wire, as contemplated herein, is formed of a copper-nickel alloy containing about 25 to 35% nickel, up to about 1 or 1.5% iron, up to less than 0.12% carbon, up to 2% or 3% manganese, up to 1% titanium, up to about 1% silicon, up to about 0.5 or 0.75% aluminum, up to 0.03% boron, up to about 1% cobalt, and the balance essentially copper. A preferred alloy contains about 29 to 32% nickel, about 0.3 to 0.75% iron, carbon up to about 0.04 or 0.05%, about 0.5 to 1% manganese, about 0.2 to 0.4% titanium, up to about 0.25% silicon, up to about 0.2% aluminum, up to 0.02% boron, the balance being essentially copper. The latter composition is paticularly advantageous by reason of the presence of iron. The prior WE 187 electrode of certain manufacture required two different formulations depending upon electrode diameter, i.e., 3/32 and 18 inch on the one hand versus 3/16 and 5/32 inch on the other hand. This is eliminated in accordance with the invention. Thus, there is an economic benefit.

The flux, including the most preferred embodiment is comprises as follows in Table I:

TABLE I

| Component | General % | Preferred % | Nominal % |
|---|---|---|---|
| Calcium Carbonate | about 5–35 | 20–30 | 26 |
| Ruflux P | about 1–5 | 1.5–3 | 2 |
| Cryolite | about 20–40 | 25–35 | 30 |
| Titanium Dioxide | about 10–30 | 14–20 | 16 |
| Aluminum Powder | about 1–5 | 1.5–3 | 2 |
| Manganese Powder | about 2–8 | 3–6 | 4 |
| Nepheline Syenite | about 5–12 | 6–10 | 8 |
| Calcium Fluoride | about 2–8 | 2.5–6 | 4 |
| Lithium Carbonate | about 0–8 | 2–4 | 3 |
| Bentonite | about 2–7 | 3–5 | 4 |
| Alginate TX-120 | about 0–2 | 0.5–1 | 0.75 |
| Natrosol | about 0–0.5 | 0.15–0.35 | 0.25 |
| Silicon | about 0.25–2 | 0.5–1.5 | 1 |

As is known to those skilled in the art, a binder is normally used in conjunction with the flux to aid in obtaining a desirable and hard coating upon drying and baking. An appropriate binder is as follows: about 20 to 40% sodium silicate, about 4 to 10% potassium silicate, a small amount, say, 0.5 to 2%, of lithium-sodium polysilicate and water in an amount of 1 to 3%.

The general roles of calcium carbonate, cryolite, titanium dioxide, and bentonite in the flux are known to those skilled in the art and are described in '479. However, as to calcium carbonate it is preferred that this constituent be composed of both fine and coarse particles with the coarser particles being present relative to the finer particles in a ratio of about 1 to 3, preferably 1.5 to 2.5. The reason for this is that the finer particles contribute to a smooth coating texture while the coarser particles aid in controlling flux texture.

Concerning manganese powder it is preferred to use electrolytic manganese powder as distinct from, say, ferromanganese. Since the preferred core wire contains iron, the use of ferromanganese could result in a needlessly high iron content in the weld deposit. As indicated infra, the iron content in the deposit should not exceed about 1% or 1.25%.

With regard to other flux constituents Reflux P, (essentially 73–77% $TiO_2$, 19–21% $K_2O$ and about 1% $ZrO_2$) is advantageous in that it obviates the need for barium carbonate. Barium carbonate has been used to assist in smoothing out the arc. However, the presence of barium is objectionable since it can be considered an environmental hazard, i.e., weld fumes are given off which tend to be poisonous if inhaled to the excess. In any case, Reflux P does not detract from operability and it tends to reduce porosity count though in a minor way. At a 6% level, Reflux P does tend to degrade operability, particularly since the slag becomes too fluid in out of position welding.

Aluminum powder is a most important flux constituent for several reasons. Porosity in the overhead position is due largely, it is believed, to the evolvement of gases which are entrapped in the deposit. Aluminum reacts with the gases, particularly oxygen to form aluminum oxide, and, thus, greatly reduces porosity count. Instances of complete porosity elimination have been observed. And, in addition, the oxide are not trapped by the weld such as to cause the formation of inferior weld deposits. In a general conceptual sense what is required is a flux component which will reduce porosity to acceptable levels by tying up entrapped gases, but yet not form a compound which would transfer across the arc and thus subvert the weld deposit.

Nepheline syenite (essentially 59–61% $SiO_2$, 23–25% $Al_2O_3$, 9–11% $Na_2O$, 5.5–6.5% $K_2O$, plus about 1% $CaO$, 1% $Fe_2O_3$ and 0.5% $MgO$) improves ease of operability. It also contributes to the silicon content of the weld deposit but on a considerably lesser note than silicon as discussed below.

Calcium fluoride is beneficial since fluorine is evolved which in turn cleanses the area around the arc and, thus, contributes to a sound weld.

Silicon improves certain mechanical properties of the weld deposit, particularly strength. It also enhances ease of operability. It can be added in the form of the commercial product designated NISILOY which contains approximately 64.5% nickel, 32.5% silicon, 2% calcium and 0.5% each of copper and iron. Since the deposit contains a large amount of nickel, and since only a small amount of NISILOY need be added, operability is not adversely affected. Silicon can be omitted where weld deposits of lower yield strengths can be tolerated. Generally, silicon should not exceed 0.5% and advantageously does not exceed about 0.3% since above this level elongation drops off.

Lithium carbonate, while not absolutely essential, is a carbon dioxide former which assists in protecting the welding operation from contaminants in the atmosphere.

Finally, Alginate TX-120, and Natrosol, commercial off-the-shelf products, are extrusion aids, i.e., facilitate the extrusion of the flux onto the core wire. They also improve green strength. At least one such extrusion aid is preferably present.

In the production of electrodes, the flux can be applied by extrusion or other convenient means well known to those skilled in the art. Drying and baking can be carried out at such temperatures as to largely evaporate the water in the binder (heating at roughly 250° to 400° F. (121° to 204° C.) followed by heating/baking at a higher temperature, 550° to 850° F. (288° to 454° C.) until a hard adherent coating is found. A baking period of 1 or 1-½ to 3 hours is suitable.

The following details and data are given as illustrative of the invention.

A welding flux composed of about 9% calcium carbonate fine particles and about 17% coarse particles, about 30% cryolite, about 4% calcium fluoride, about 4% bentonite, about 16% titanium dioxide, about 3% lithium carbonate, about 4% manganese powder, about 2% aluminum powder, about 8% nepheline syenite, about 0.25% Natrosol, about 2% Ruflux P and about 0.75% Alginate TX-120 was extruded onto a core wire containing about 0.03% carbon, 0.8% manganese, 0.5% iron, 0.1% silicon, 1.!% titanium, 67.8% copper and 30.4% nickel plus impurities. The flux also contained silicon added as 3% Nisiloy and a binder comprised of approximately 20.6% sodium silicate, 0.7% of a lithium/sodium polysilicate, 4.1% potassium silicate and water. The composite electrode was oven baked and dried as outlined hereinbefore.

EXAMPLE I

Four electrodes were prepared as set forth in Table II.

TABLE II

| Length of Core Wire | Diameter of Coating | Diameter of Core Wire |
|---|---|---|
| 12 | 0.150 | 0.093 |
| 14 | 0.195 | 0.125 |
| 14 | 0.235 | 0.156 |
| 14 | 0.275 | 0.187 |

All four diameter core wire electrodes were used to assess mechanical properties for QPL (Qualified Product List) purposes as established by U.S. Navy standards. Thus, using shielded metal-arc welding (SMAW) copper-nickel plates ½"×3"×12" for the 0.093" and 0.125" diameters ⅜×3"×12" the 0.156" and the 0.187" diameter were butt welded at a 60° included angle, the amperage conforming to those set forth in the Schedule below:

SCHEDULE

| Diameter (in.) | Amperes (DCRP) |
|---|---|
| 0.093 | 60–85 |

-continued
SCHEDULE

| Diameter (in.) | Amperes (DCRP) |
|---|---|
| 0.125 | 70–170 |
| 0.156 | 100–145 |
| 0.187 | 130–190 |

The weld deposits were analyzed spectrographically and by wet chemical analysis, the compositions being given in Table III (deposit analysis for the 0.156 and 0.187 core wire electrodes included) with mechanical properties being reported in Table IV. (Radiographic analysis was conducted on the ¾" plates for the 0.156" and 0.187" diameters since for this test it is required by U.S. Navy standards. The radiographic results were wholly acceptable. See Table V.

TABLE III

| | Weld Metal Analysis | | | |
|---|---|---|---|---|
| Element | .093" | .125" | .156" | .187" |
| C | 0.010 | 0.010 | 0.010 | 0.010 |
| Mn | 1.74 | 1.60 | 1.48 | 1.49 |
| Fe | 0.55 | 0.54 | 0.54 | 0.55 |
| S | 0.006 | 0.004 | 0.004 | 0.005 |
| Si | 0.40 | 0.38 | 0.35 | 0.36 |
| Cu | 67.67 | 67.85 | 67.95 | 67.21 |
| Ni | 29.59 | 29.57 | 29.61 | 30.32 |
| Ti | 0.04 | 0.05 | 0.06 | 0.06 |
| P | 0.008 | 0.008 | 0.008 | 0.007 |
| Al | 0.035 | 0.030 | 0.028 | 0.029 |

TABLE IV

| | Electrode Diameter | | | |
|---|---|---|---|---|
| | 3/32" | ⅛" | 5/32" | 3/16" |
| Tensile Strength (ksi) | 60.7 | 60.2 | 54.6 | 55.3 |
| Tensile Strength (ksi) | 60.2 | 59.7 | 56.0 | 55.7 |
| 0.2% Yield Strength (ksi) | 38.6 | 34.9 | 34.8 | 34.2 |
| 0.2% Yield Strength (ksi) | 38.9 | 35.4 | 36.6 | 34.9 |
| Elongation (%) | 39 | 40 | 44 | 40 |
| Elongation (%) | 36 | 44 | 47 | 39 |
| Reduction of Area (%) | 71 | 65 | 69 | 70 |
| Reduction of Area (%) | 71 | 71 | 67 | 70 |

TABLE V

| Largest Allowable | | Largest Measured | | Total Porosity Area | |
|---|---|---|---|---|---|
| Pore | Slag | Pore | Slag | Allowable | Measured |
| .050 | .156 | .000 | .035 | .015 | .000 |
| .075 | .187 | .000 | .000 | .0225 | .0000 |
| .125 | .312 | .025 | .000 | .045 | .0015 |
| .125 | .312 | .000 | .000 | .045 | .0000 |

All mechanical properties were quite satisfactory. The tensile strength of a welded joint required under MIL-E-0022200/B4(SHIPS) is 50,000 psi, a level well exceeded in accordance herewith.

EXAMPLE II

A second set of plates were similarly welded but in the vertical-up position to demonstrate usability. Again the 0.093 and 0.125 core wire electrodes were used, the plates being ¼"×6"×10" and ⅜"×6"×10", respectively. Radiographic examinations were made of the weld deposits and it was found that the results were in full compliance with the NAVSHIPS 0900-003-9000 specification. No cracking or porosity was observed.

EXAMPLE III

Using the 0.093 and 0.125 core wire electrodes SMAW was again employed, this time to assess welding in the overhead position. The plates welded were ⅜"×6"×10" and the included angle was again 60°. Operability in all respects was quite satisfactory and radiographic analysis of the weld deposits reflected very low porosity and well within specification requirements.

Bend tests were then performed in accordance with the MIL-E-0022200/4B(SHIPS) specification. In accordance with this test the weld deposit is visually examined on the convex surface of the bend by the unaided eye. Acceptance requires that there shall not be evidence of fissuring over ⅛" long in any direction. Three bends were made for each of the 3/32", ⅛", 5/32" and 3/16" weldments. No fissuring was detected for any of the 12 bends, irrespective of electrode size.

To the foregoing might be added that the dielectric strength of the electrodes was found to be excellent as determined in accordance with the MIL-E-22200F specification. In accordance with this test the coverings of electrodes at room temperature and in the "dry" condition must have a dielectric strength sufficient to insulate effectively against a difference potential (breadkown voltage) of 110 volts. The average breakdown voltage for each electrode is set forth in Table VI.

TABLE VI

| Electrode Diameter (in.) | 3/32 | ⅛ | 5/32 | 3/16 |
|---|---|---|---|---|
| Average Breakdown (voltage) | 646 | 758 | 876 | 955 |

As can be readily seen, the dielectric strength was well in excess of 110 volts in each instance.

The present invention is applicable to the welding of copper-nickel alloys and, in particular, those of the 70–30 type containing 25–35% nickel, up to 2% iron, up to 3% manganese, up to 1% or more of titanium, up to 1% silicon, up to 0.2% carbon, up to 0.02% boron, up to 0.5% zirconium, up to 2% columbium, up to 2% vanadium, the balance being essentially copper together with impurities. It is also applicable to welding copper-nickel alloys of the 90-10 type containing principally up to 15% nickel, up to 2% silicon, up to 2% manganese, up to 2% iron, the balance being essentially copper. The subject invention is also useful for overlaying metal substrates. The flux/core wire combination also results in excellent weld deposits of low porosity in all welding positions, the deposits being characterized by high tensile strengths well in excess of 50,000 psi, e.g., upwards of 54,000–55,000 psi, together with good ductility and freedom of deleterious cracks. The deposits contain 25 to 35% nickel; up to 0.2 or 0.3% aluminum, e.g., 0.005 to 0.15%; up to 2% iron, e.g., 0.2 to 0.8 or 1%; up to 3% manganese, e.g., 0.75 to 2.5%; up to 1% silicon and preferably 0.25 to 0.75% silicon; up to 1% titanium, e.g. 0.02 to 0.5%; the balance being essentially copper. It should be mentioned that the aluminum in the covered electrode is largely not recovered in the deposit since it does not go across the arc. Thus, depending upon flux composition, only a minor amount, if any, may be recovered. It is not recommended to use ferro-aluminum in either the flux or core wire.

Although the present invention has been described in conjunction with preferred embodiments, it is to be understood that modifications and variations may be resorted to without departing from the spirit and scope of the invention, as those skilled in the art will understand. In terms of ranges of alloying constituents, the given percentage of an element may be used with a given percentage of one or more of the other elements. This specification includes any numerical value within a given elemental range and any given range of heat treatment.

The embodiments of the invention in which an exclusive property or privilege is claimed are defined as follows.

1. A flux composition adapted to provide covered electrode welding operability and which minimizes the occurrence of porosity in the overhead welding position, said flux consisting essentially of about 5 to about 35% calcium carbonate, about 20 to about 40% cryolite, about 10 to about 30% titanium dioxide, about 1 to about 5% aluminum powder, about 2 to about 8% manganese powder, about 2 to about 8% calcium fluoride, up to about 8% lithium carbonate, about 2 to about 7% bentonite, about 1 to about 5% of an arc agent containing 73–77% $TiO_2$, 19–21% $K_2O$ and about 1% $ZrO_2$ and about 5 to about 12% nepheline syenite.

2. The flux set forth in claim 1 which contains about 0.25 to 2% silicon.

3. The flux set forth in claim 1 which contains up to about 2.5% additional extrusion aid.

4. The flux set forth in claim 1 in which the calcium carbonate is comprised of both fine and coarse particles in a ratio of about 1 to 3.

5. The flux set forth in claim 1 in which the manganese powder is electrolytic manganese.

6. The flux set forth in claim 1 containing about 20 to 30% calcium carbonate, about 25 to 35% cryolite, about 14 to 20% titanium dioxide, about 1.5 to 3% aluminum powder, about 3 to 6% manganese powder, about 2.5 to 6% calcium fluoride, about 2 to 4% lithium carbonate, about 3 to 5% bentonite, about 0.5 to 1.5% silicon, about 1.5 to 3% of an arc agent containing 73–77% $TiO_2$, 19–21% $K_2O$ and about 1% $ZrO_2$ and about 6 to 10% nepheline syenite.

7. A welding electrode having a core wire containing about 25 to 35% nickel, up to about 1.5% iron, up to about 0.12% carbon, up to 3% manganese, up to about 1% titanium, up to about 1% silicon, up to about 0.75% aluminum, up to about 0.03% boron, up to about 1% cobalt and the balance copper and impurities, the core wire having a flux coating consisting essentially of about 5 to about 35% calcium carbonate, about 20 to about 40% cryolite, about 10 to about 30% titanium dioxide, about 1 to about 5% aluminum powder, about 2 to about 8% manganese powder, about 2 to about 8% calcium fluoride, up to about 8% lithium carbonate about 2 to about 7% bentonite, about 1 to about 5% of an arc agent containing 73–77% $TiO_2$, 19–21% $K_2O$ and about 1% $ZrO_2$ and about 5 to about 12% nepheline syenite.

8. The welding electrode of claim 7 which contains about 0.25 to 2% silicon.

9. The flux set forth in claim 7 which contains up to about 2.5% additional extrusion aid.

10. The welding electrode of claim 7 in which calcium carbonate is comprised of both fine and coarse particles in a ratio of about 1 to 3.

11. The welding electrode of claim 7 in which the manganese powder is electrolytic manganese.

12. The welding electrode of claim 7 in which the flux contains about 20 to 30% calcium carbonate, about 25 to 35% cryolite, about 14 to 20% titanium dioxide, about 1.5 to 3% aluminum powder, about 3 to 6% manganese powder, about 2.5 to 6% calcium fluoride, about 2 to 4% lithium carbonate, about 3 to 5% bentonite, about 0.5 to 1.5% silicon, about 1.5 to 3% of an arc agent containing 73–77% $TiO_2$, 19–21% $K_2O$ and about 1% $ZrO_2$ and about 6 to 10% nepheline syenite.

13. A copper-nickel weld deposit characterized by low porosity, a tensile strength of at least 50,000 psi, said deposit consisting essentially of 25 to 35% nickel, aluminum up to 0.3%, up to 2% iron, up to 3% manganese, up to 1% silicon, up to 1% titanium, the balance being essentially copper.

14. The weld deposit of claim 13 in which the aluminum content is about 0.005 to 0.15%.

15. The weld deposit of claim 14 which contains 0.2 to 1% iron, 0.75 to 2.5% manganese and 0.25 to 0.75% silicon.

* * * * *